Nov. 14, 1950 W. A. BLACK 2,529,672
DISPENSING APPARATUS
Filed Feb. 6, 1947 2 Sheets-Sheet 1
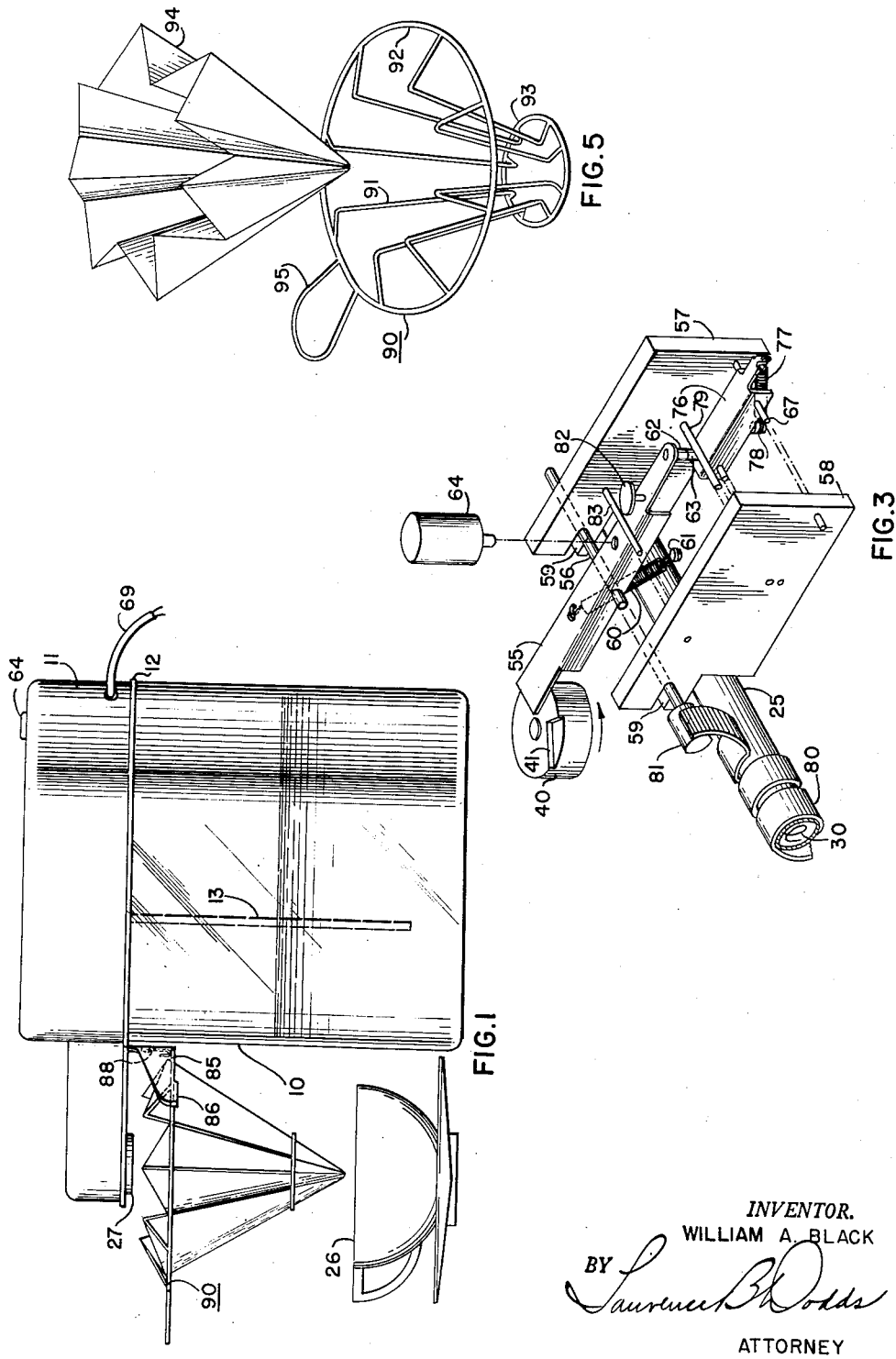
INVENTOR.
WILLIAM A. BLACK
BY
*Laurence B. Dodds*
ATTORNEY Nov. 14, 1950     W. A. BLACK     2,529,672
DISPENSING APPARATUS
Filed Feb. 6, 1947     2 Sheets-Sheet 2
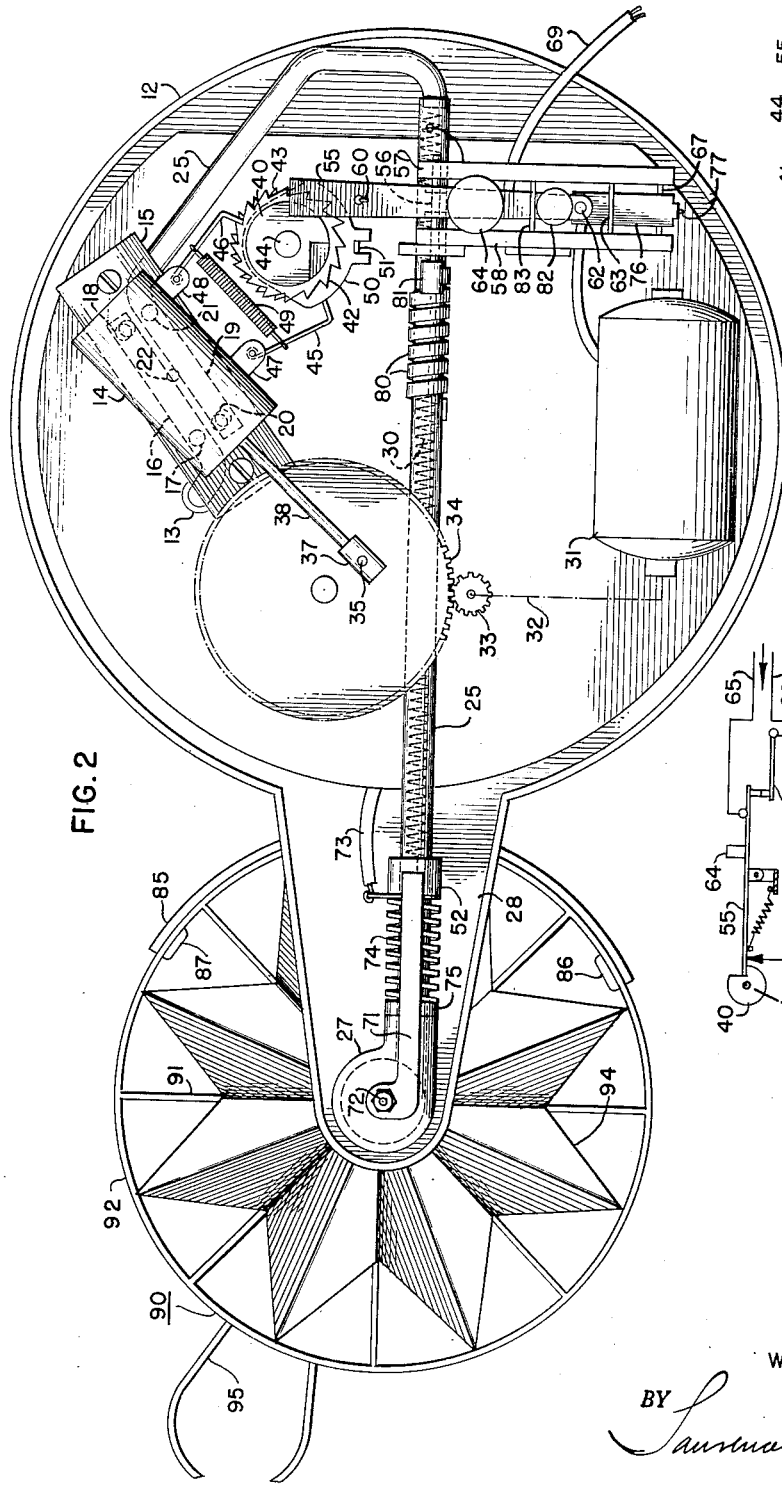
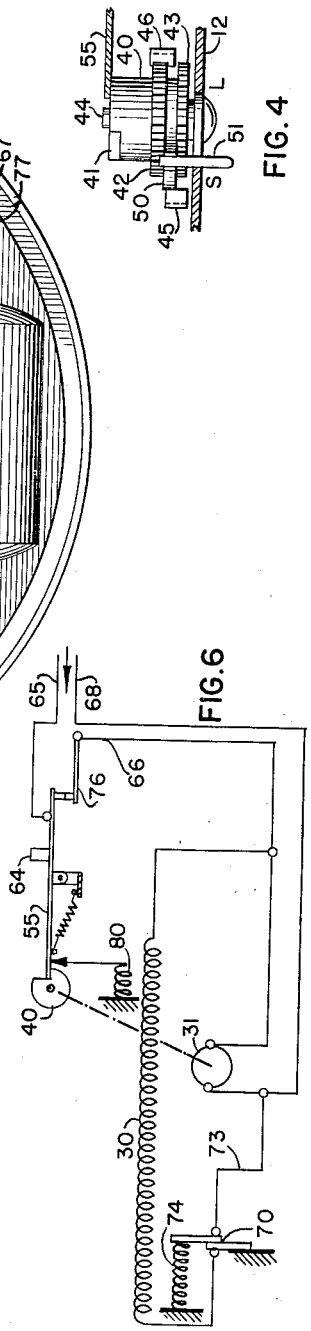
*INVENTOR.*
WILLIAM A. BLACK
BY *Laurence B. Dodds*
ATTORNEY Patented Nov. 14, 1950

2,529,672

UNITED STATES PATENT OFFICE 2,529,672

DISPENSING APPARATUS

William A. Black, Montclair, N. J.

Application February 6, 1947, Serial No. 726,877

15 Claims. (Cl. 219—39)

This invention relates to apparatus for dispensing a measured quantity of liquid at an elevated temperature from a reservoir to a receptacle. While being subject to a wide variety of applications, the invention is especially suited for use as a coffee maker for the home and will be particularly described in that connection.

Coffee makers of many different types have already been proposed for home use. In one prior arrangement a container for water is provided, this container being in communication with a superposed chamber for holding suitably prepared ground coffee. A measured amount of water is placed in the container and a related amount of the prepared coffee is introduced into the other chamber. Thereafter heat is applied, usually by setting the apparatus over a gas flame or other heating device. As the water is brought to approximately the boiling point, it enters the coffee chamber where infusion occurs and the beverage is produced. Arrangements of this type are exceedingly well known and are perfectly satisfactory for many homes, but they are subject to certain inherent limitations which may cause them to be undesirable for others. It is found, for example, that the apparatus must be used with a minimum amount of water, usually well over a full cup. To maintain the desired strength of the beverage, a corresponding amount of the prepared coffee must also be used. Where the demand is for a single cup, such arrangements are uneconomical and introduce a certain amount of waste. Further, it frequently takes a considerable period of time to raise the temperature of the water to the appropriate value, whereas it is highly desirable that the coffee making be practically instantaneous.

In another prior apparatus, water is contained in a large reservoir and a spring-actuated piston pump withdraws a measured quantity thereof each time the pump is actuated. The discharge from the pump is conducted through a heating chamber to a discharge outlet disposed above a filtering container in which the prepared coffee is placed. In the operation of this apparatus, the piston pump is depressed, withdrawing a quantity of water from the reservoir into the pump cylinder and simultaneously energizing a heating element included in the heating chamber. As the piston returns toward its initial position, the water previously admitted to its cylinder is forced to the heating chamber where it is raised to the desired temperature and is discharged into the prepared coffee. Infusion takes place and the beverage filters through the coffee holder to a cup which may be placed under the filter. When the pump finally returns to its initial position, the heater is deenergized and the apparatus is conditioned for the next operating cycle.

The last-described apparatus, utilizing a spring-actuated pump, is undesirable in that such mechanisms cannot be relied upon to deliver the same measured amount of liquid over any appreciable service life. It also has the disadvantage that the discharge from the pump does not occur at a uniform rate for all operating conditions so that unnecessary restrictions are imposed on the design of the heating chamber to assure raising the temperature of the water supplied to the brewing chamber to the proper value. Additionally, it is not convenient to vary the quantity of liquid delivered by the pump during any operating cycle which, of course, is necessary where it is desired to have the apparatus prepare varying amounts of coffee to be supplied to large or small size cups.

It is, therefore, an object of the present invention to provide a new and improved apparatus, suitable for use as a coffee maker for the home, which avoids one or more of the aforementioned limitations of prior arrangements.

It is another object of the invention to provide a new and improved apparatus for dispensing a measured quantity of liquid at an elevated temperature from a reservoir to a receptacle.

It is a further object of the invention to provide a new and improved apparatus for dispensing a selectable amount of liquid at an elevated temperature from a reservoir to a receptacle.

In accordance with the invention, an apparatus for dispensing a measured quantity of liquid at an elevated temperature from a reservoir to a receptacle comprises means for providing a fluid outlet for the reservoir, and means, such as a pump, connected to that outlet for extracting liquid therethrough at a given uniform rate of flow. A discharge outlet is provided for the pump to dispense liquid to the receptacle, and heating means, which may comprise an electrical heating element, is associated with the fluid path between the outlets. The heating element has a rate of heat generation which is proportioned to the rate of flow established by the pump. The apparatus also includes means for actuating the pump and for simultaneously operating the heating element for a predetermined operating interval, thereby to dispense a measured quantity of liquid at an elevated temperature.

For a better understanding of the present invention, together with other and further objects thereof, reference is had to the following description taken in connection with the accompanying drawings, and its scope will be pointed out in the appended claims.

In the drawings, Fig. 1 is an elevational view of a liquid-dispensing apparatus in accordance with the invention; Fig. 2 is a plan view, on an enlarged scale, of a portion of the apparatus of Fig. 1; Fig. 3 is a perspective exploded view illustrating the switching mechanism of the apparatus; Fig. 4 is a detail view of a timing device; Fig. 5 represents a filter and holder for the prepared coffee; while Fig. 6 is a schematic representation of the circuit diagram of the dispensing apparatus.

Referring now more particularly to Figs. 1 and 2, the apparatus there represented will be described as a coffee maker suited for use in the home. It comprises a reservoir 10 which may take the form of a glass or plastic cylinder for holding a relatively large quantity of cold water. This container is closed by a removable cover assembly 11, housing the principal portions of the dispensing apparatus. This assembly includes a base plate 12 shaped to rest upon the top lip of the container. A glass tube 13, projecting from base plate 12 into container 10, provides a fluid outlet for the water reservoir.

The apparatus has means connected to outlet 13 for extracting liquid therethrough at a given uniform rate. This means, for the embodiment under consideration, comprises a double-acting positive-displacement reciprocating pump 14. The pump, as shown in Fig. 2, is supported upon the upper surface of a manifold 15 which, in turn, is secured to the top portion of supporting plate 12. A driving motor 31 is connected, as indicated by the broken construction line 32, to a speed-reducing gear system 33, 34, for actuating the pump. To this end, the gear 34 carries a vertically projecting crank pin 35 for engaging an aperture included in a sleeve 37 secured to the free end of the pump shaft 38.

The manifold 15 includes an intake duct 16 which communicates with outlets 17 and 18 at either end. The manifold also accommodates a discharge duct 19, likewise having associated openings 20 and 21 at its opposite ends. Preferably, the top surface of the manifold 15 is flat and the pump cylinder 14, which is generally circular in cross section, has a flattened portion providing a plane of contact between the cylinder and manifold. The manifold 15 has a centrally located, vertically projecting pivot pin 22 to be received by a recess in the pump cylinder for pivotally securing this cylinder to the manifold. The pump cylinder has aligned ports, on either side of pivot pin 22, for registration with manifold ports 17, 18, 20, and 21. As represented in Fig. 2, the pump ports are superposed over inlet port 18 and discharge port 20 of manifold 15.

The described assembly of the pump and manifold is positioned close to the peripheral edge of supporting plate 12 and a discharge duct 25, communicating with the manifold portion 19, provides a discharge outlet for the pump for dispensing liquid withdrawn from container 10 to a receptacle, such as a cup 26 shown in Fig. 1. The discharge duct 25, preferably, has the configuration illustrated in Fig. 2, providing a fluid path that extends diametrically across supporting plate 12 to an annular-shaped discharge outlet 27 accommodated by a projection 28 of the base plate. The outlet 27 is arranged in tangential relationship with reference to the linear portion of duct 25.

Liquid withdrawn from the container and discharged through the described duct 25 is raised to a suitable temperature by heating means associated with the fluid path between the intake and discharge outlets of the apparatus. The heating element is shown as an elongated coil 30 disposed within and extending along the internal periphery of the linear section of duct 25 and formed of a coil of Nichrome wire. The heating coil is selected to have a rate of heat generation proportioned to the uniform rate of flow established by pump 14 to raise the temperature of water traversing duct 25 at that rate to a desired elevated temperature.

The apparatus further includes control means for actuating pump 14 and for simultaneously operating heater 30 for a predetermined operating interval to dispense a measured quantity of liquid from container 10. This control means includes an adjustable timing device and a normally open energizing circuit for heater 30 and motor 31 which may be completed for a selected operating interval determined by the timer. The timer referred to comprises a cam assembly 40 having a notch or cam portion 41 in its upper surface, as shown in Figs. 2, 3, and 4. This assembly also includes a pair of ratchet wheels 42 and 43 having unequal numbers of teeth and coaxially supported with cam 40 for rotation upon a stud shaft 44. A pair of driving pawls 45 and 46 is carried by supporting lugs 47 and 48, respectively, secured to pump cylinder 14. A spring 49 biases the driving pawls in the direction of ratchet wheels 42 and 43 to complete adjustable driving connections from motor 31 to the timing assembly, as will be made clear presently. The pawls 45 and 46 are vertically displaced, as shown in Fig. 4, so that each is able to engage only one of ratchet wheels 42, 43. A timing adjustment cam 50 is positioned between the ratchet wheels for relative rotation therebetween under the control of a pin 51 projecting through the lower surface of supporting plate 12. This cam, as indicated in Fig. 2, has a portion which may selectively engage either of pawls 45 and 46 to displace the selected one from engagement with its associated ratchet wheel.

The energizing circuit which is under the control of the described timing device includes a normally open control switch 55, shown in its actuated or closed condition in both Figs. 2 and 3. The switch blade is pivotally supported upon a shaft or pivot pin 56, received by aligned notches 59, 59 of vertically arranged insulated supporting plates 57 and 58. The notches 59, 59 permit displacement of pivot pin 56 and switch blade 55 in a horizontal plane for purposes to be made clear hereinafter. A spring 60, extending between switch blade 55 and an anchor pin 61 projecting from base plate 12, biases the switch for counterclockwise rotation about pivot pin 56. One end of the switch arm is in the immediate vicinity of the timer cam assembly 40, resting directly upon the top surface thereof when the switch is in its closed or actuated position, as represented in Figs. 2 and 3, and resting against the side surface thereof in its open or unactuated condition. The other end of the switch arm carries a contact 62 for engagement with a mating contact 63. The latter is supported on one end of a conductive member 76, pivoted on a pin 67 and biased for rotation thereon in a clockwise direction by a spring 77. This spring is secured to the opposite end of member 76 and to an anchor, indicated at 78. A stop bar 79 limits the clockwise rotation of this member. Conductors, which have been omitted from Fig. 3 in order to simplify the drawing, are connected with contacts 62 and 63 in any conventional manner to include the switch in the circuit of the dispensing apparatus. An actuator 64, in the form of a push button, engages switch blade 55 at an off-center position and provides means for overcoming spring 60 to close contacts 62, 63.

The circuit of the apparatus is completely represented in Fig. 6. Leads 65 and 68 indicate extensions of a power cord 69 (Figs. 1 and 2) through which the apparatus may be connected to any suitable receptacle or power outlet. Conductor 65 continues the circuit of the power cord through the switch contacts to a conductor 66, connecting with one terminal of motor 31 and one terminal of heater 30. Conductor 68, on the other hand, connects to the opposite terminal of the motor and through a conductor 73 and a fuse link 70 to the other end of the heater. The fuse link, shown in Fig. 2 is provided by a conducting finger 71 extending from a terminal 72 which projects through the closed upper surface of discharge outlet 27 and connects within the outlet to one end of coil 30. The free end of conductive finger 71 is soldered to a conductive sleeve 52 which is freely slidable along the outer periphery of duct 25. This sleeve carries a terminal for conductor 73 connecting the fusible link and one terminal of motor 31. A tension spring 74, disposed about duct 25, rests at one end against a rubber grommet 75 which seals duct 25 to the discharge outlet fixture 27 and, at its opposite end, rests against sleeve 52.

A thermostatic device 80 is also placed around duct 25, having one end anchored to base plate 12 and the other abutting against an enlarged projection 81 of pivot pin 56 of the switch. The thermostatic device is provided for opening the switch to disable the heating means in the event of failure of the liquid flow at the desired rate through the discharge duct. Thermostat 80 is also effective to lock switch 55 against actuation in the event of an abnormally low flow of liquid through duct 25 during an operating interval in which the heater is energized. To this end, the thermostat controls the operation of a normally inoperative locking device for switch 55. The locking device is provided by a first lock portion or projection 82, carried by the switch as shown in Fig. 3, and a co-operating second lock portion, in the form of a pin 83, supported by plates 57 and 58 but normally disengaged from lock projection 82.

All of the described mechanism is supported on the upper surface of plate 12 and is covered by a removable cap which has a polished surface so that the entire arrangement has a pleasing appearance. A U-shaped bracket 85 is suspended from the lower portion of the projection 28 of the supporting plate. It has a pair of flanges 86 and 87 at either end, and a centrally located support 88 which engage a framework 90, shown in Fig. 5. This framework has a series of formed fingers 91 extending between vertically displaced rings 92 and 93. The fingers 91 are peripherally spaced about the inner circumferences of the rings to support a folded filter 94 which serves to hold the prepared coffee. A handle 95 facilitates inserting the upper ring 92 on the top surfaces of flanges 86 and 87 and beneath finger 88 of bracket 85, thereby to locate the filter in coaxial alignment with discharge outlet 27.

In using the described arrangement, cover assembly 11 is removed and a quantity of water introduced into the container or reservoir 10. With the cover removed, the timing lever 51 is moved to either of its extreme positions, indicated L and S in Fig. 4, in accordance with the demands of the particular use. For the representation of Fig. 4, the apparatus is to supply coffee to a small cup. Having adjusted the timer to the desired size of cup, the closure member 11 is replaced with supporting plate 12 resting on the periphery of container 10. The power cord 69 is then connected with a suitable receptacle and the frame 90 and filter 94, with a proper amount of prepared coffee, are positioned on the bracket 85. The apparatus is now in its normal quiescent condition. The switch 55 is open, resting against the right-hand side surface of cam assembly 40, as viewed in Figs. 2 and 3, but is set to be closed upon the actuation of button 64 which projects through the cap member.

When the operating member 64 is depressed, contacts 62 and 63 are closed completing a circuit which simultaneously energizes motor 31 and heater 30. At the same time, spring 60 pivots pin 56, as permitted by notches 58, 59 of the supports 57 and 58, to bring one end of the switch over cam assembly 40. The button 64 may then be released but the operating circuit will remain closed because the switch, resting on the cam assembly, is held in its operated condition. With the motor energized, gear train 33, 34 reciprocates the piston of pump 14. With each displacement of the piston, a measured amount of liquid is withdrawn by way of the intake manifold 16 and a corresponding amount of liquid is discharged through the exhaust manifold 19 into the duct 25. Continued operation of the pump results in a uniform flow of liquid through duct 25 and this liquid is raised to the appropriate temperature by the heater 30 and discharged tangentially into the annular-shaped outlet 27. The discharged liquid mixes with the prepared coffee in filter 94 and the resulting beverage filters through into cup 26.

The crank-type connection between the pump piston and gear 34 causes the pump cylinder to oscillate about pivot pin 22 and this oscillation reciprocates the driving pawls 45 and 46. The pawl selected by the actuation of timing control lever 51 advances the associated ratchet wheel 42 or 43 with each pump oscillation. After a preselected time interval determined by the effective ratchet wheel, the control portion 41 or notch of timing cam 40 reaches its actuating position directly beneath the free end of switch arm 55. At this instant, spring 60 is free to rotate the switch in a counterclockwise direction, nesting its free end within notch 41. Spring 77 permits contact 63 to follow the resulting movement of contact 62, keeping the switch closed. As the motor operation continues, the trailing edge of the notch engages the left-hand edge of the arm and pivots the switch with its pivot pin 56 in a clockwise direction. Finally, the switch is thus forced out of notch 41 to the side of the cam cylinder, whereupon spring 60 rotates the switch on its pivot. The stop 79, which limits the movement of member 76, prevents contact 63 from following contact 62 further and opens the switch as well as the circuits to the motor and the heater. In this manner, with each actuation of operating member 64, the motor and heater are simultaneously energized for a preselected operating interval, thereby to control pump 14 to dispense a measured quantity of hot water to discharge outlet 27 in accordance with the selected timing ratchet wheel 42 or 43. Of course, the dispensing operation may be continued until the level of water within reservoir 10 falls below the free end of intake duct 13. At that time, more water is to be added. Further, in successive operating cycles, the apparatus may deliver the same measured quantity of hot water or the timing control 51 may be adjusted, as required, appropriately to select the quantity delivered in any given cycle. At the conclusion of each such cycle, switch 55 is returned to its normal open position and the apparatus is set for the next cycle to begin immediately.

If, for any reason whatsoever, the pump fails to deliver a uniform flow of liquid during its operating cycle, thermostat 80 expands and pivots switch-supporting pin 56 in a clockwise direction. This movement of the supporting pin forces switch arm 55 off cam cyclinder 49 and permits spring 60 to open the circuits of both the motor and the heater at contacts 62, 63. Where there is an interruption in liquid flow through duct 25 during any operating cycle, the thermostat expands greatly. This not only opens the switch as already explained, but also displaces the switch in the direction of cam cyclinder 40. As a consequence, the locking portions 82 and 83 are brought in engagement to lock the apparatus against further actuation until the thermostat has cooled and contracted, enabling spring 60 to release the lock elements. This protects the duct 25 from receiving cold water when the duct temperature is abnormally high.

The protection of thermostat 80 is usually sufficient but the fusible link, afforded by the soldered connection of conductive member 71 and sleeve 52, provides still additional protection. Should the thermostat fail during any operating interval in which the liquid flow through discharge duct 25 is not at the uniform rate normally established by the pump 14, the soldered connection between elements 71 and 52 breaks away and spring 74 forces sleeve 52 out of contact with member 71, thereby to break the circuit of the heater.

The described arrangement has many inherent advantages over other devices heretofore known to the art. By utilizing a positive-displacement pump which establishes a uniform flow of liquid during any operating cycle, the design of the heating element is simplified and the apparatus exhibits a higher degree of efficiency. The adjustable timer, which permits a control of the operating cycle, facilities utilizing the arrangement to supply selectable amounts of liquid during any operating cycle. While the operation has been predicated upon the assumption that a single cup of coffee is to be produced during any operating cycle, it will be understood that the timer may be arranged to have several cups supplied where this is desired. The arrangement has the added feature that the prepared beverage may be obtained in an extremely short period of time since the discharge duct and its heating element may raise the temperature of a uniform flow of liquid to an elevated value within the short period required for the liquid to travel along that duct to the discharge outlet.

The tangential outlet 27 is also very desirable because it minimizes difficulties which may otherwise be encountered due to the generation of small amounts of steam. The heating element normally brings the delivered water close to the boiling point, but variations in the operating potentials or in the temperature of the water placed in reservoir 10 may sometimes cause small quantities of steam to be produced. The tangential outlet imparts a whirling motion to the dispensed liquid so that the steam may be harmlessly dissipated.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for dispensing a measured quantity of liquid at an elevated temperature from a reservoir to a receptacle comprising: means providing a fluid outlet for the reservoir; positive-displacement pumping means connected to said outlet for pumping liquid therethrough at a given uniform rate of flow; a discharge outlet for said pumping means for dispensing liquid to the receptacle; heating means associated with the fluid path between said outlets and having a rate of heat generation proportioned to said rate of flow; and means for actuating said pumping means and for simultaneously operating said heating means for a predetermined operating interval, thereby to dispense a measured quantity of liquid at said elevated temperature.

2. Apparatus for dispensing a measured quantity of liquid at an elevated temperature from a reservoir to a receptacle comprising: means providing a fluid outlet for the reservoir; a double-acting positive-displacement pumping means connected to said outlet for pumping liquid therethrough at a given uniform rate of flow; a discharge outlet for said pumping means for dispensing liquid to the receptacle; heating means associated with the fluid path between said outlets and having a rate of heat generation proportioned to said rate of flow; and means for actuating said pumping means and for simultaneously operating said heating means for a predetermined operating interval, thereby to dispense a measured quantity of liquid at said elevated temperature.

3. Apparatus for dispensing a measured quantity of liquid at an elevated temperature from a reservoir to a receptacle comprising: means providing a fluid outlet for the reservoir; means connected to said outlet for extracting liquid therethrough at a given uniform rate of flow; a discharge outlet for said extracting means for dispensing liquid to the receptacle; heating means comprising an electrical heating element included within the fluid path between said outlets and having a rate of heat generation proportioned to said rate of flow; and means for actuating said extracting means and for simultaneously energizing said heating element for a predetermined operating interval, thereby to dispense a measured quantity of liquid at said elevated temperature.

4. Apparatus for dispensing a measured quantity of liquid at an elevated temperature from a reservoir to a receptacle comprising: means providing a fluid outlet for the reservoir; means connected to said outlet for extracting liquid therethrough at a given uniform rate of flow; a discharge outlet for said extracting means for dispensing liquid to the receptacle; heating means associated with the fluid path between said outlets and having a rate of heat generation proportioned to said rate of flow; and adjustable timing means for actuating said extracting means and for simultaneously operating said heating means for a preselected operating interval, thereby to dispense a measured quantity of liquid at said elevated temperature.

5. Apparatus for dispensing a measured quantity of liquid at an elevated temperature from a reservoir to a receptacle comprising: means providing a fluid outlet for the reservoir; means, including a positive-displacement pump and a driving motor therefor, connected to said outlet for extracting liquid therethrough at a given uniform rate of flow; a discharge outlet for said pump for dispensing liquid to the receptacle; heating means comprising an electrical heating element associated with the fluid path between said outlets and having a rate of heat generation proportioned to said rate of flow; means for simultaneously energizing said driving motor and said heating element; and timing means for de-energizing said motor and said heating element after a predetermined operating interval, thereby to dispense a measured quantity of liquid at said elevated temperature upon the actuation of said driving motor and said heating element.

6. Apparatus for dispensing a measured quantity of liquid at an elevated temperature from a reservoir to a receptacle comprising: means providing a fluid outlet for the reservoir; means, including a positive-displacement pump and a driving motor therefor, connected to said outlet for extracting liquid therethrough at a given uniform rate of flow; a discharge outlet for said pump for dispensing liquid to the receptacle; heating means comprising an electrical heating element associated with the fluid path between said outlets and having a rate of heat generation proportioned to said rate of flow; means for simultaneously energizing said driving motor and said heating element; and timing means controlled by said motor for de-energizing said motor and said heating element after a predetermined operating interval, thereby to dispense a measured quantity of liquid at said elevated temperature upon the actuation of said driving motor and said heating element.

7. Apparatus for dispensing a measured quantity of liquid at an elevated temperature from a reservoir to a receptacle comprising: means providing a fluid outlet for the reservoir; means, including a positive-displacement pump and a driving motor therefor, connected to said outlet for extracting liquid therethrough at a given uniform rate of flow; a discharge outlet for said pump for dispensing liquid to the receptacle; heating means comprising an electrical heating element associated with the fluid path between said outlets and having a rate of heat generation proportioned to said rate of flow; means for simultaneously energizing said driving motor and said heating element; a timing cam assembly having a control portion effective to de-energize said motor and said heating element; and an adjustable driving connection from said motor to said timing cam for driving said control portion to an actuating position after a preselected operating interval, thereby to control said apparatus to dispense a measured quantity of liquid at said elevated temperature upon the actuation of said driving motor and said heating element.

8. Apparatus for dispensing a measured quantity of liquid at an elevated temperature from a reservoir to a receptacle comprising: means providing a fluid outlet for the reservoir; means, including a positive-displacement pump and a driving motor therefor, connected to said outlet for extracting liquid therethrough at a given uniform rate of flow; a discharge outlet for said pump for dispensing liquid to the receptacle; heating means comprising an electrical heating element associated with the fluid path between said outlets and having a rate of heat generation proportioned to said rate of flow; means for simultaneously energizing said driving motor and said heating element; a timing cam assembly having a control portion effective to de-energize said motor and said heating element and including a pair of ratchet wheels having unequal numbers of teeth for moving said cam control portion to an actuating position; a pair of driving pawls driven from said motor; and means for selectively engaging one of said pawls with one of said ratchet wheels while freeing the other of said ratchet wheels from said pawls, thereby to control said apparatus in accordance with the selected one of said ratchet wheels to dispense a measured quantity of liquid at said elevated temperature upon the actuation of said driving motor and said heating element.

9. Apparatus for dispensing a measured quantity of liquid at an elevated temperature from a reservoir to a receptacle comprising: means providing a fluid outlet for the reservoir; means connected to said outlet for extracting liquid therethrough at a given uniform rate of flow; a discharge duct connected at one end to said extracting means and terminating at the opposite end in a tangentially disposed, annular-shaped outlet for dispensing liquid to the receptacle; heating means associated with the fluid path between said outlets and having a rate of heat generation proportioned to said rate of flow; and means for actuating said extracting means and for simultaneously operating said heating means for a predetermined operating interval, thereby to dispense a measured quantity of liquid at said elevated temperature.

10. Apparatus for dispensing a measured quantity of liquid at an elevated temperature from a reservoir to a receptacle comprising: means providing a fluid outlet for the reservoir; means connected to said outlet for extracting liquid therethrough at a given uniform rate of flow; a discharge duct connected at one end to said extracting means and terminating at the opposite end in a tangentially disposed, annular-shaped outlet for dispensing liquid to the receptacle; a heating coil extending along the internal periphery of said duct and having a rate of heat generation proportioned to said rate of flow; and means for actuating said extracting means for simultaneously energizing said heating coil for a predetermined operating interval, thereby to dispense a measured quantity of liquid at said elevated temperature.

11. Apparatus for dispensing a measured quantity of liquid at an elevated temperature from a reservoir to a receptacle comprising: means providing a fluid outlet for the reservoir; means connected to said outlet for extracting liquid therethrough at a given uniform rate of flow; a discharge outlet for said extracting means for dispensing liquid to the receptacle; heating means associated with the fluid path between said outlets and having a rate of heat generation proportioned to said rate of flow; means for actuating said extracting means and for simultaneously operating said heating means for a predetermined operating interval, thereby to dispense a measured quantity of liquid at said elevated temperature, and means responsive to the heat generated by said heating means for disabling said heating means in the event of a failure of liquid flow at said rate between said outlets.

12. Apparatus for dispensing a measured quantity of liquid at an elevated temperature from a reservoir to a receptacle comprising: means providing a fluid outlet for the reservoir; means, including a positive-displacement pump and a driving motor therefor, connected to said outlet for extracting liquid therethrough at a given uniform rate of flow; a discharge outlet for said pump for dispensing liquid to the receptacle; heating means comprising an electrical heating element associated with the fluid path between said outlets and having a rate of heat generation proportioned to said rate of flow; an energizing circuit for said driving motor and said heating element including a switch normally biased to an open condition; an actuator for closing said switch simultaneously to energize said driving motor and said heating element; and a timing device driven by said motor having a cam portion effective to engage said switch after a predetermined operating interval of said motor and return said switch to its normal open condition, thereby to dispense a measured quantity of liquid at said elevated temperature upon the actuation of said actuator and immediately to recondition the apparatus for another operating cycle.

13. Apparatus for dispensing a measured quantity of liquid at an elevated temperature from a reservoir to a receptacle comprising: means providing a fluid outlet for the reservoir; means, including a pump and a driving motor therefor, connected to said outlet for extracting liquid therethrough at a given uniform rate of flow; a discharge outlet for said pump for dispensing liquid to the receptacle; an electrical heating element associated with the fluid path between said outlets and having a rate of heat generation proportioned to said rate of flow; control means for simultaneously energizing said driving motor and said heating element for a predetermined operating interval, thereby to dispense a measured quantity of liquid at said elevated temperature; and a thermostatic device responsive to the heat generated by said heating element for de-energizing said driving motor and said heating element and for locking said control means against actuation in the event of an abnormally low flow of liquid between said outlets.

14. Apparatus for dispensing a measured quantity of liquid at an elevated temperature from a reservoir to a receptacle comprising: means providing a fluid outlet for the reservoir; means, including a pump and a driving motor therefor, connected to said outlet for extracting liquid therethrough at a given uniform rate of flow; a discharge outlet for said pump for dispensing liquid to the receptacle; an electrical heating element associated with the fluid path between said outlets and having a rate of heat generation proportioned to said rate of flow; control means, including a normally operable switch, for simultaneously energizing said driving motor and said heating element for a predetermined operating interval, thereby to dispense a measured quantity of liquid at said elevated temperature; a normally inoperative locking device for said switch; and a thermostatic device responsive to the heat generated by said heating element for de-energizing said driving motor and said heating element and for effecting a locking engagement between said switch and said locking device to lock said switch against actuation in the event of an abnormally low flow of liquid between said outlets.

15. Apparatus for dispensing a measured quantity of liquid at an elevated temperature from a reservoir to a receptacle comprising: means providing a fluid outlet for the reservoir; means, including a pump and a driving motor therefor, connected to said outlet for extracting liquid therethrough at a given uniform rate of flow; a discharge outlet for said pump for dispensing liquid to the receptacle; an electrical heating element associated with the fluid path between said outlets and having a rate of heat generation proportioned to said rate of flow; control means, including a normally operable switch having a first lock portion, for simultaneously energizing said driving motor and said heating element for a predetermined operating interval, thereby to dispense a measured quantity of liquid at said elevated temperature; a co-operating second lock portion normally disengaged from said first lock portion; and a thermostatic device responsive to the heat generated by said heating element for de-energizing said driving motor and said heating element and for displacing said switch to effect engagement of said first and second lock portions to lock said switch against actuation in the event of an abnormally low flow of liquid between said outlets.

WILLIAM A. BLACK.

REFERENCES CITED

The following references are of record in the file of this patent:

UNITED STATES PATENTS

| Number | Name | Date |
|---|---|---|
| 460,979 | Mitchell | Oct. 13, 1891 |
| 1,184,178 | Hanks | May 23, 1916 |
| 1,683,070 | Hanks | Sept. 4, 1928 |
| 2,100,330 | Getchell | Nov. 30, 1937 |